United States Patent Office 3,507,814
Patented Apr. 21, 1970

3,507,814
MULTIFUNCTIONAL AZIRIDINO COMPOUNDS, POLYMERIC PRODUCTS THEREOF AND PRODUCTION PROCESSES
Heinz Uelzmann, Cuyahoga Falls, Ohio, assignor to The General Tire & Rubber Company, a corporation of Ohio
No Drawing. Filed Jan. 13, 1967, Ser. No. 608,987
Int. Cl. C08g 23/06, 43/02
U.S. Cl. 260—2         16 Claims

ABSTRACT OF THE DISCLOSURE

Multifuntcional aziridino compounds are prepared by reaction of alkylenimines and similar aziridinyl hydrocarbons with glycidyl acrylate and similar unsaturated carboxyepoxy compounds. With equimolar proportions of reactants, epoxyaziridin compounds are obtained and with greater proportions of the alkylenimine reagents, diaziridino compounds are produced. The epoxyaziridino compounds may be converted to prepolymers which can be further polymerized with Lewis acid catalysts to form hard cross-linked resins. The diaziridino compounds are useful as polymer cross-linking and chain-extending agents. The polymers are useful as adhesive compositions.

BACKGROUND OF THE INVENTION

Ethylenimine is the simplest form of an aziridino compound. These products contain one or more aziridino groups of the generic formula:

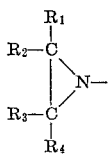

wherein $R_1$, $R_2$, $R_3$ and $R_4$ may be the same or different radicals including hydrogen, alkyl, cycloalkyl, aryl, heterocyclo, etc.

This class of compound has received extensive investigation in the past decade because of the potential reactivity of the aziridino group with active hydrogen compounds and a host of other reagents. The products have been widely tested for cross-linking reactions, creaseproofing textiles, curing resins, forming polymers and resins and many other purposes.

The varied compounds prepared and investigated in the past have included hydrocarbon derivatives (U.S. 3,231,563), hydroxy hydrocarbon derivatives (U.S. 3,165,509), carboxyl derivatives (U.S. 3,038,776 and 3,182,040), phosphoric acid derivatives (U.S. 2,606,901), phopshinic acid derivatives (U.S. 3,205,034), urea derivatives (U.S. 3,266,931) and thiophosphoric acid derivatives (U.S. 2,672,459). Tables of these and other aziridino compounds are given in U.S. 3,260,702 and 3,115,490.

The present invention relates to yet another class of aziridino compounds, i.e., those containing at least one aziridino group plus a carboxy group and an epoxy group. Broadly, aziridino compounds containing carboxylic groups are not new (see U.S. 3,223,681) nor are those containing epoxy groups (U.S. 3,240,720). New compounds of the invention are distinctive in containing both carboxy (—C—O—) and epoxy (—C———C—) groups
         ‖                    \ /
         O                     O While many of the prior known aziridino compounds are of the monoaziridino class (U.S. 3,240,720), many contain a plurality of the groups (U.S. 3,266,931). Of this latter class, some may contain also a hydroxy group (U.S. 3,165,509) as do the new compounds which form another embodiment of this invention.

OBJECTS

A principal object of this invention is the provision of new compounds containing aziridino and epoxy groups joined together by a bridging group containing a carboxyl group.

Further objects include the provision or attainment of the following:

(1) New carboxyepoxy aziridino compounds.
(2) New hydroxy carboxy diaziridino compounds.
(3) New polymerizable monomers and prepolymers containing both aziridino and epoxy groups which can be reacted with a variety of organic and inorganic substances to produce new combinations of monomeric and polymeric products.
(4) New adhesive compositions comprising adducts of ethyleniminie and glycidyl acrylate or similar adducts of equivalent reactants as an active adhesive agent.
(5) Prepolymers of aziridino epoxy compounds which may be catalyzed with Lewis acid catalysts to form hard cross-linked resins useful for production of machineable castings or the like.
(6) Polymerizable monomers and prepolymers capable in the presence of basic catalysts to undergo epoxy polymerization to form polymeric products containing active aziridino groups which may be used for cross-linking reactions after epoxy polymerization is completed to form products modified with carboxylic acids, mercaptans or the like.
(7) New aziridino compounds which may be reacted with proton-active substances to create modified products including epoxy groups which may then be employed in further reactions or polymerizations.
(8) New methods for the production of carboxyepoxyaziridino compounds.

Other objects and further scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

GENERAL DESCRIPTION

These objects are accomplished according to the present invention by reaction of alkylenimines and equivalent aziridino compounds with glycidyl acrylate or equivalent unsaturated carboxyepoxy compounds to form carboxyepoxy aziridino compounds which may be represented by the following general formula:

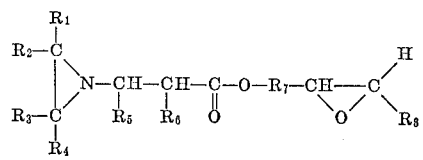

wherein $R_1$, $R_2$, $R_3$ and $R_4$ are hydrogen or 1 to 5 carbon alkyl,
$R_5$ is hydrogen, 1 to 5 carbon alkyl or 1 to 5 carbon alkenyl,
$R_6$ is hydrogen, methyl or ethyl,
$R_7$ is a bivalent hydrocarbon radical of 1 to 16 carbon atoms, and
$R_8$ is hydrogen or 1 to 5 carbon alkyl.

In place of ethylenimine in the new processes, there may be used with generally similar results aziridinyl hydrocarbons of the formula:

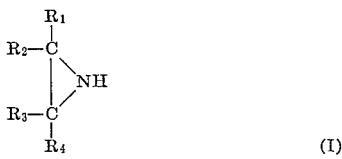

wherein $R_1$–$R_4$ have the meaning hereinbefore defined.

In place of glycidyl acrylate, carboxy epoxy compounds useable in the new process may be represented by the formula:

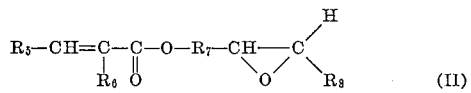

wherein $R_5$–$R_8$ have the meaning hereinbefore defined.

As another embodiment of the invention, the incremental reaction of at least 2 mols of reagent I with each mol of reagent II may be used to produce compounds represented by the following general formula:

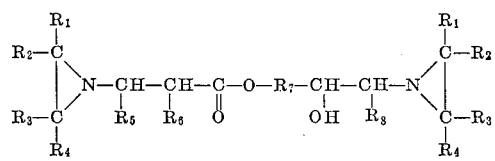

$R_1$–$R_8$ have the meaning hereinbefore defined.

The reagents I and II as hereinbefore defined would be free of active or activatable halogen, sulfur, and phosphorous atoms which would interfere with the reaction such as those atoms combined in sulfonic acid groups, phosphonic acid groups, mercaptans, alkyl halides, acid halides, sulfonyl halides, phosphonyl halides, etc. They should also be free from acid groups such as carboxylic acid groups. In the case of reagent I, the critical group is the aziridino group and in the case of reagent II, the essential group or radical is the olefinic group vicinal to the carboxyl group.

The preparation of the new adducts of the invention is advantageously carried out at a temperature of 25 to 40° C. If the addition of the two essential reagents I and II is reversed, i.e., if reagent II is added to reagent I, polymeric products may be obtained since excess aziridino compound appears to catalyze polymerization of the epoxy compound. Under such procedure, polymeric products can be obtained which generally have the consistency of thick oils. These viscous prepolymers can be advantageously used as casting resins or the like since they may be catalyzed with Lewis acid catalysts to form hard cross-linked resins.

The new monomers from glycidyl acrylate and the prepolymers derived from glycidyl methacrylate can be reacted with a variety of organic or inorganic substances to provide new combinations of a monomeric or polymeric nature.

Monomeric or polymeric carboxylic acids, anhydrides, acid chlorides, mercaptans, sulfonic acids, phosphonic acids, or their corresponding acid halides, epoxy compounds, epoxy resins, amines, hydrazines, amides, hydrazides, and other functional groups which react with the aziridine or epoxy ring, can be modified or cross-linked with the above mentioned glycidyl aziridine compounds. Polymers without functional groups can also be blended into these compositions as also may plasticizers, elastomers and the like.

The new carboxyepoxy aziridino compounds are extremely reactive not only to form new combinations with other reagents, but also in undergoing homopolymerization even at room temperature so that the new monomers should be refrigerated in order to preserve them. Although the new compounds will polymerize at room temperature, heat will increase this reaction and with reaction for sufficient time at temperatures between about 20 to 150° C., the monomers will form cross-linked homopolymers having a hardness as high as Shore D hardness of 80 or greater. The higher the substitution of the compounds, i.e., the greater the molecular weight of groups $R_1$–$R_8$, the more stable the compounds are at room temperature. Lewis acid type catalysts, such as $BF_3$, increase the rate of reaction and all polymers resulting from such catalysts are cross-linked.

The monomers of the invention, as well as prepolymers and resins, show good adhesion on metal after curing and are useful in forming adhesive products. Castings may be made from the monomers of prepolymers and the resulting resins can be lathed, cut, sawed and otherwise mechanically worked to make pallet rollers, printed rolls, coatings, casters, buttons, switchplates and levers, trays, tote boxes, potting, and encapsulation compounds for electrical devices and the like. The monomeric adducts or prepolymers thereof are useful as cross-linkers, chain-extending and/or catalysts for epoxy resins, polyester-styrene mixtures and equivalent reagents frequently used in adhesives, molding compositions and the like.

DESCRIPTION OF PREFERRED EMBODIMENTS

The following details of actual operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1.—Glycidyl β-(N-ethylenimino)propionate

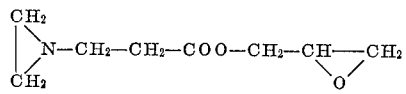

Glycidyl acrylate, 128 parts, was added dropwise with stirring at 25 to 30° C. to 45 parts ethylenimine. The reaction mixture was allowed to stir for 2 hours after completion of addition at a temperature not exceeding 30° C., followed by heating to 50° for one hour. The reaction mixture was then cooled to room temperature and distilled in vacuum.

The main fraction boiled at 88 to 92° C. at 1.5 to 2 mm. Hg. The yield was 86.4 parts. The pot temperature never exceeded 100° C. to avoid spontaneous polymerization.

On standing at 25° C. for 24 hours, a viscous prepolymer was formed.

On standing at room temperature, this monomer formed a hard cross-linked polymer after one to two weeks. The Shore D hardness was 80.

The compound can be kept in a monomeric form by keeping it refrigerated, e.g., at 0° C.

In another case, the foregoing procedure was repeated, except that the excess of ethylenimine was distilled off in vacuum up to a pot temperature of 60°. The contents were poured into a glass jar and allowed to polymerize. After three days the product had formed a hard resin. The Shore D hardness was 82 to 85. The product could be lathed or drilled.

Example 2.—Glycidyl B-(N-propylenimino)propionate

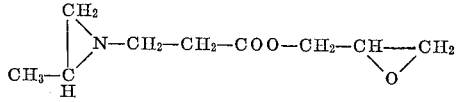

Glycidyl acrylate, 256 parts, was heated to 35° with agitation and 108 parts propylenimine were added while maintaining the temperature at 35 to 45° C. After addition, the mixture was heated to 75° C. for one hour, cooled and fractionated immediately in vacuum. The main fraction boiled at 62 to 85° C. at 0.3 mm. Hg. Yield was 272 parts (73% of the theoretical). The material was redistilled with the main fraction boiling at 75 to 83° C. at 0.3 mm. Hg and on analysis was found to contain 6.55% nitrogen (calc. 7.56%).

The material required refrigeration to prevent homopolymerization.

A part of the monomer was allowed to stand at room temperature for one week. After this time, it had formed a clear, transparent prepolymer with the consistency of an oil. With a trace of BF₃-etherate as catalyst, this prepolymer cured within 10 to 15 minutes to form a clear, transparent and cros-linked resin with a Shore D hardness of 65 to 68.

Example 3

Ten parts of monomeric glycidyl β-(N-propylimino) acrylate, from Example 2 were mixed with 30 parts dodecenylsuccinic anhydride in a glass container. Temperature rose from 26° C. to 31° C. in 30 minutes. After two days standing, a solid polymer was obtained, somewhat resilient and cross-linked with a tendency to crumble. After two months it was very hard with a Shore D hardness of 65.

Example 4.—Glycidyl β-(N-butylenimino)propionate

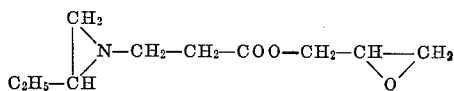

Glycidyl acrylate, 115 parts, were heated with stirring to 50° C. and 65 parts of butylenimine were added dropwise, keeping the temperature between 50 and 65° C.

After addition was completed, the reaction mixture was stirred at 60 to 65° C. for two hours. Then it was cooled and distilled in vacuum. The main fraction boiled at 81–83° C. (0.1 mm. Hg) and amounted to 93 parts which analysis showed to contain 6.61% nitrogen (calc. 7.00).

Example 5.—Reaction product of glycidyl methacrylate and ethylenimine

Glycidyl methacrylate, 71 parts, was mixed in a glass container with 21.5 parts ethylenimine. Within 2.5 hours, the temperature rose from 16 to 29° C., forming a viscous prepolymer. After two days standing at room temperature, a solid, but still soft, polymer was obtained. After two more days, the polymer was hard with a Shore D hardness of 30.

Example 6.—Reaction product of glycidyl methacrylate and propylenimine

Glycidyl methacrylate, 142 parts, was mixed with 58 parts propylenimine in a glass container. The temperature rose from 9 to 29° in about 6 hours. No increase in viscosity was noted after this time. After nine days standing at room temperature, a crystal-clear prepolymer was obtained which had the consistency of an oil. This oil became thicker after 22 days, but still flowed. After two months, the polymer did not flow any more, but was still tacky.

Part of the prepolymer which had been standing for nine days and having the consistency of an oil was mixed with 1.5% of its weight BF₃-etherate (47%) at room temperature. A clear, hard, and cross-linked resin was formed within 15 minutes with evolution of heat. After one day, the Shore D hardness was found to be 65.

Example 7.—Reaction product of glycidyl methacrylate and butylenimine

Glycidyl methacrylate, 142 parts, was mixed with 71 parts butylenimine at room temperature in a glass jar. After three days standing, only a slight increase in viscosity was noted. After 3½ months, the prepolymer formed was clear and transparent and had the viscosity of a thick oil.

Twenty parts of the prepolymer were mixed with 0.2 part of 47% BF₃-etherate in a small jar and placed for 45 minutes into an oven at 120° C. A solid, resilient, and cross-linked polymer was obtained.

Example 8.—BF₃-catalyzed reaction of glycidyl methacrylate and propylenimine (preparation of a casting resin)

Glycidyl methacrylate, 71 parts, was mixed with 29 parts propylenimine and 0.5 part of a 33% solution of BF₃ in dibutylcarbitol. The mixture was kept at room temperature and was still liquid after 16 hours. After 4 days, it was very viscous. Placed into an oven at 50° C., for 56 hours, the polymer was solid with a Shore D hardness of 70. After 3 months at room temperature, the Shore D hardness was still 70.

Example 9.—BF₃-catalyzed reaction of glycidyl methacrylate and ethylenimine (preparation of a casting resin)

Glycidyl methacrylate, 71 parts, was mixed with 21.5 parts ethylenimine and 0.5 part of a 33% solution of BF₃ in dibutylcarbitol. After 16 hours at room temperature, the reaction mixture was solid, but still resilient. It was then placed into an oven at 50° C. for 3 days and the resilience had almost disappeared. After 56 more hours at 50° C., the Shore D hardness was 35. After three months at room temperature, the resin still had a Shore D hardness of 35.

Example 10.—Combination with epoxy resin

A mixture was made in a metal cylindrical container of the following materials in the parts by weight indicated:

| | Parts |
|---|---|
| Polyglycidyl ether epoxy resin | 200 |
| Glycidyl methacrylate | 142 |
| Propylenimine | 56 |
| Boron trifluoride 33% solution in dibutylcarbitol | 1 |

(The epoxy resin was a commercial product "Epon 828" in the form of a mixture of polyglycidyl ethers made by reacting epichlorohydrin with Bisphenol A, i.e. 2,2-bis (4-hydroxy phenyl) propane—see Dearborn et al., Ind. & Eng. Chem., 45, 2715–2721.)

The mixture in the container was placed in an oven and heated at 50° C. for 43 hours. A resin casting having a Shore A hardness of 51 was obtained.

Example 11.—Combination with epoxy resin

A liquid mixture was prepared from 200 parts of "Epon 828" and 198 parts of glycidyl β-(N-ethylenimino)propionate. This was charged into an open aluminum dish and left standing for 5 days at room temperature (25° C.). A solid resin was obtained with a Shore A hardness of 52 on the air exposed surface and 75 on the bottom. When placed in an oven at 50° C. for three days, the resin casting had a Shore D hardness of 82.

Example 12.—Combination with polyester-styrene

A polyester-styrene product containing 30% styrene and 70% polyester was prepared by initial reaction of isophthalic acid, maleic anhydride, ethylene glycol and diethylene glycol followed by addition of styrene.

An epoxy aziridinyl prepolymer was prepared from butylenimine and glycidyl methacrylate using the procedure of Example 7 to have a viscosity of a slow flowing oil.

A mixture of resulting prepolymer and P-S product was prepared with the following ingredients:

| | Parts |
|---|---|
| P-S product | 200 |
| Aziridinyl epoxy prepolymer | 100 |
| BF₃-etherate (47%) | 1 |
| 2,5-dimethylhexane-2,5-dihydroperoxide | 1 |

Part of the mixture was charged into a glass container and heated at 120° C. for 3 hours. A light brown, transparent resin casting was obtained which had a Shore D hardness of 75.

Example 13.—Adhesive application

Part of the mixture of Example 12 was applied as a coating to an iron plate having a phosphated surface and the coated plate was heated at 120° C. for three hours. The resulting coating was flexible, had a Barcol hardness of 34 and exhibited strong adhesion to the phosphated plate.

Example 14.—Polyaziridino adduct

The compound 2-hydroxy-3-(N-ethylenimino)-propyl β-(N-ethylenimino)propionate was prepared.

There were added dropwise 128 parts of glycidyl acrylate to a charge of 129 parts of pure ethylenimine. The reaction was started with the charge at 54–55° C. and as the addition of the ethylenimine progressed, the temperature rose to 80° C. The reaction mixture was slowly agitated and the contents reacted adiabatically (80° C. max.) for about 19 hours. Then excess ethylenimine was distilled off under vacuum at 40° C. Upon analysis, the product was found to have an aziridine content of 35.8% avg. (calc. 37.3%).

Example 15.—Adhesive compositions

An adhesive was prepared by mixing together the following ingredients in the parts indicated:

| | Parts |
|---|---|
| Epoxy resin ("Epon 828") | 100 |
| Ethylenimine - glycidyl/acrylate prepolymer (Example 1) | 50 |

A pair of 2.5 x 10 cm. coupons of phosphated steel were then coated on one side at one end with a thin layer of the liquid mixture. The coated areas of the coupons were then placed together with 1 cm. overlap. With the plates clamped together in this position, they were heated at 120° C. for one hour. Then the clamps were removed and the shear adhesions were measured on an "Instron" test machine at 1.25 mm./min. crosshead speed. The shear adhesion was 149.5 kg./sq. cm.

In another case, the prepolymer was used by itself as the adhesive. The shear adhesion was 63.4 kg./sq. cm.

The above procedure was repeated using the following adhesive composition:

| | Parts |
|---|---|
| Epoxy resin "Epon 828" | 67 |
| Epoxy resin "ERRA 0300" | 33 |
| Prepolymer (Example 5) | 10 |

The shear adhesion in this case was 136.0 kg./sq. cm.

The same procedure was repeated using a mixture of equal parts of the epoxy resin "Epon 828" and ethylenimine-glycidyl methacrylate prepolymer (Example 5). The shear adhesion was 151.2 kg./sq. cm.

The procedure was again repeated using a mixture of equal parts of epoxy resin "Epon 828" and the polyaziridino adduct of Example 14. The shear adhesion was 91.8 kg./sq. cm.

In the foregoing examples whenever used, the aziridino reagents and glycidyl reagents were freshly distilled prior to use. The syntheses of compounds as described were preformed in a glass reaction vessel equipped with internal stirrer, thermometer, reflux condenser and valved fluid inlet tube.

DISCUSSION OF DETAILS

The aziridinyl compounds (reagent I) and the carboxyepoxy compounds (reagent II) may be, in many case obtained commercially although their preparation using known procedures may be used to obtain them, particularly the more highly substituted high molecular weight compounds. Advantageously, these reagents may be freshly purified such as by distillation immediately prior to use in carrying out the reactions as herein described in order to remove polymerization inhibitors and other additives or impurities which might be present in the products. Conversely, it may be found desirable to add polymerization inhibitors to the reaction mixture, e.g., see U.S. 3,227,628, before or during the course of the preparation of the new compounds in order to help preserve resulting products in monomeric form, protect against adverse reactions, etc.

Representative examples of aziridino hydrocarbons of the structure of reagent I as hereinbefore defined include:

ethylenimine, i.e., aziridine
2-methyl aziridine
2-ethyl aziridine
2,2,3,3-tetramethyl aziridine
2-amyl aziridine
2-methyl-3-amyl aziridine
2-methyl-3-butyl aziridine
2,2-dimethyl-3-ethyl aziridine
2,2-diethyl aziridine.

The chemical structure of the aziridinyl reagent employed in the reactions effects the chemical reactivity and physical properties of resulting products. Unsubstituted ethylenimine generally creates final products of greatest hardness. Substitution, particularly with alkyl groups of higher molecular weight, creates final products of lesser chemical activity, slower tendency to homopolymerize and resulting polymers are softer.

The products of the invention are also influenced by the structure of the unsaturated carboxyepoxy compound selected from those having the structural formula of reagent II as hereinbefore defined. When the epoxy compound is unsubstituted or the substitutions or alkyl groups are in the lower range, e.g., methyl or ethyl, and the bridging group $R_7$ is the methylene group, the polymers of the resulting adducts are the hardest. As the molecular weight of the substituents or the molecular weight of the bridge group $R_7$ is increased, the resulting polymers become softer and also, the general chemical reactivity of the adduct is lower.

Representative examples of the bridging group $R_7$ include the following:

methylene
ethylene
p-phenylene
p-2-methyl phenylene
methylene-p-phenylene
cyclopentylene
octylene
hexylene
p-phenylene butylene
cyclohexylene
methylene-o-isopropyl phenylene Representative examples of carboxyepoxyaziridino compounds within the new class of compounds of the invention as hereinbefore defined include:

glycidyl 3-(N-ethylenimino)propionate
glycidyl 3-(N-propylenimino)propionate
glycidyl 3-(N-butylenimino)propionate
glycidyl 3-(N-ethylenimino)-2-methyl propionate
2,3-epoxydecyl-3-(N-ethylenimino)propionate
9,10-epoxydecyl-3-(N-ethylenimino)-2-vinyl propionate
(4-oxiranyl benzyl)-3-(N-ethylenimino)caproate
[(2-glycidyl cyclopentyl)butyl]-3-(2-ethyl-3-methyl aziridino)butyrate
(4-oxiranyl phenyl)-3-(2-hexyl-2-methyl-3-ethyl aziridino)-2-ethyl propionate
[(5,6-epoxyhexyl)phenyl]-3-(N-ethylenimino) propionate
(3-oxiranyl cyclohexyl)-3-(2,2-diethyl aziridino)-2-methyl propionate
[(2-oxiranyl-4-isopropyl)benzyl]-3-aziridino-caprylate
2,3-epoxyhexyl-3-(tetramethyl aziridino)-2-methyl butyrate
2,3-epoxybutyl-3-(N-ethylenimino)propionate 2,3-epoxybutyl-3-(2,2-diethyl-3-amyl aziridino)-3-vinyl-2-ethyl propionate Determination of chemical composition of products resulting from practice of the invention can be obtained by analysis of reaction products for nitrogen content, aziridine content and other atom or molecular group content according to established analytical procedures. Aziridine content is a particularly useful technique and known method for such analysis involves opening of the aziridine ring as reported in J.A.C.S. 77, 5918 (1955).

The multi-functionality of the new carboxyepoxyaziridino compounds has been briefly mentioned above. This is due, of course, not only to a plurality of reatcive groups in the same molecular, but a difference in chemical types between these groups, i.e., aziridinyl group and oxiranyl group. The aziridinyl groups react with organic acids and polymers containing —COOH groups to form aminoethylene groups. The mechanism is reported in J. Org. Chem. 9, 500 (1944). The aziridinyl group can react with epoxides to form hydroxy ethylene groups (see U.S. 2,475,068) and with hydroxy groups, e.g., as present in polyols, epoxy resins, etc., to form aminoethoxy groups (see J.A.C.S., 77, 5116 (1955). There is, accordingly, in such polymer reactions possible multiplication of functional groups using the new compounds rendering these materials useable in cross-linking and chain-ending reactions. Combinations of cross-linking and chain-ending in controlled proportions and degrees in polymers is also possible using mixtures of the new compounds, i.e., both the epoxyaziridino type and the diaziridino type, to produce unique combinations of gel content, plasticity, molecular weight and other properties (see copending application of H. Uelzmann, Serial No. 402,341, filed Oct. 7, 1964).

The adhesive qualities of homopolymers or copolymers made from the new epoxyaziridino compounds constitutes a note-worthy aspect of the invention. This quality makes possible the production of a host of adhesive compositions particularly useful in cementing, laminating, etc., of metal sheets or parts to create joints having good shear adhesion. Such adhesive compositions may comprise, for example, 10–90% of the epoxyaziridino compounds and, advantageously, 15–75% thereof, with other adhesive agents, fillers, pigments, catalysts, dyes, solvents, reinforcement fibers, blowing agents and the like. Combinations with epoxy resins, polyester resins, polyester-styrene resins, etc., make highly useful adhesives. Such adhesives can typically contain 1 to 10 parts of the epoxyaziridinyl resin or resin mixture. Multiple package units, e.g., separate resin and hardener units, can be employed in forming and marketing the adhesives.

The new diaziridinyl compounds, which are particularly useful as polymer cross-linking and chain-extending agents, also find utility in adhesives and as intermediates in synthesis of amino compounds.

CONCLUSION

New methods have been described by which useful and unique epoxyaziridino compounds and hydroxy diaziridino compounds can be prepared. These operations are, in part, the result of the discovery that aziridinyl hydrocarbons may be reacted with glycidyl acrylates and related epoxy alkenyl carboxylates to produce β-aziridinyl carboxylates without destruction of the epoxy substituent of the carboxylate.

The resulting compounds are highly reactive, e.g., in polymerizations and proton acceptor reactions, making the products useful in a wide range of chemical operations, formation of adhesive compositions being a noteable use.

The invention has been described in such detail and the manner and process of making and using it have been set forth in a manner contemplated to enable a person skilled in the art to which the invention pertains to make and use the same.

The embodiments of the invention in which an exclusive property or right is claimed are defined as follows:

1. A carboxyaziridino compound of the formula:

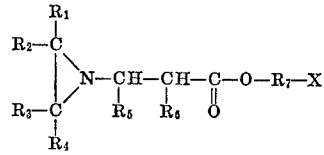

wherein $R_1$, $R_2$, $R_3$ and $R_4$ are hydrogen or 1 to 5 carbon alkyl, $R_5$ is hydrogen, 1 to 5 carbon alkyl or 1 to 5 carbon alkenyl, $R_6$ is hydrogen, methyl or ethyl, $R_7$ is a bivalent hydrocarbon radical of 1 to 16 carbon atoms, X is selected from the group of

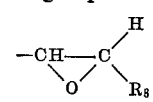

and

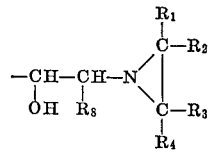

and $R_8$ is hydrogen or 1 to 5 carbon alkyl.

2. A compound as claimed in claim 1 wherein said compound has the formula:

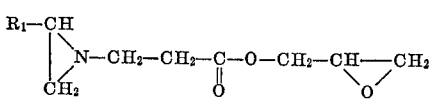

wherein $R_1$ is hydrogen or 1 to 5 carbon alkyl.

3. A compound as claimed in claim 1 wherein the compound is glycidyl β-(N-ethylenimino) propionate.

4. A compound as claimed in claim 1 wherein the compound is glycidyl β-(N-propylenimino) propionate.

5. A compound as claimed in claim 1 wherein the compound is glycidyl β-(N-butylenimino) propionate.

6. A process of producing a carboxyepoxyaziridino compound of the formula:

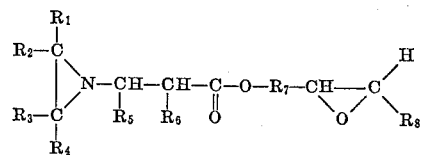

wherein $R_1$, $R_2$, $R_3$ and $R_4$ are hydrogen or 1 to 5 carbon alkyl, $R_5$ is hydrogen, 1 to 5 carbon alkyl or 1 to 5 carbon alkenyl, $R_6$ is hydrogen, methyl or ethyl, $R_7$ is a bivalent hydrocarbon radical of 1 to 16 carbon atoms, and $R_8$ is hydrogen or 1 to 5 carbon alkyl, which comprises adding increments of an aziridine compound of the formula:

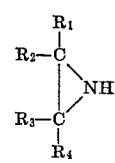

wherein $R_1$, $R_2$, $R_3$ and $R_4$ have the meaning above defined, to a carboxyepoxy compound of the formula:

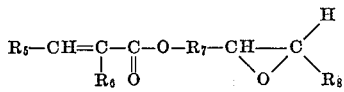

wherein $R_5$, $R_6$, $R_7$ and $R_8$ have the meaning above defined.

7. A process as claimed in claim 6 wherein said aziridine compound is ethylenimine, said carboxyepoxy compound is glycidyl acrylate, 45 parts of the ethylenimine are added dropwise to a charge of 128 parts of the glycidyl acrylate and the reaction mass is maintained at a temperature between 25 and 30° C. during the process.

8. A process as claimed in claim 6 wherein the aziridine compound is added dropwise to an approximately stoichiometrically equivalent charge of the carboxyepoxy compound and the reaction mass is maintained at a temperature between 15–100° C. during the process.

9. A compound as claimed in claim 1 wherein X is

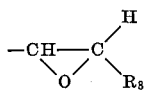

10. A homopolymer of a carboxyepoxyaziridino compound of the formula:

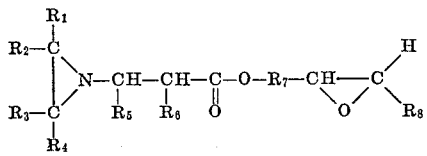

wherein $R_1$, $R_2$, $R_3$, $R_4$ and $R_8$ are hydrogen or 1 to 5 carbon alkyl,
$R_5$ is hydrogen, 1 to 5 carbon alkyl or 1 to 5 carbon alkenyl,
$R_6$ is hydrogen, methyl or ethyl, and
$R_7$ is a bivalent hydrocarbon radical of 1 to 16 carbon atoms.

11. A carboxy diaziridino compound of the formula:

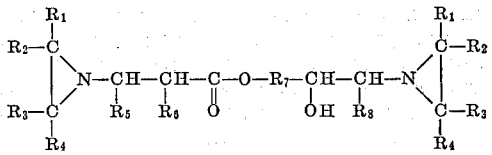

wherein $R_1$ through $R_8$ have the meaning as defined in claim 1.

12. A compound as claimed in claim 11 of the formula:

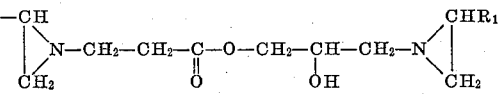

13. A compound as claimed in claim 11 wherein $R_1$ through $R_6$ and $R_8$ are all hydrogen and $R_7$ is methylene.

14. A method of producing polymeric products which comprises reacting together a polymer forming material and a carboxyaziridino compound of the formula defined in claim 1, said polymer forming material being a resin forming epoxy material consisting of a mixture of polyglycidyl ethers or a resin forming polyester consisting of a mixture of styrene and an unsaturated polyester.

15. A method of producing polymeric products which comprises reacting together a resin forming epoxy material consisting of a mixture of polyglycidyl ethers made by reacting epichlorohydrin with 2,2-bis(4-hydroxyphenyl)propane, glycidyl methacrylate and ethylenimine.

16. An adhesive composition comprising as an active adhesive agent a low molecular weight homopolymer of a carboxyepoxyaziridino compound as defined in claim 10.

References Cited

UNITED STATES PATENTS 3,240,720   3/1966   Smith.

WILLIAM SHORT, Primary Examiner
THEODORE PERTILLA, Assistant Examiner

U.S. Cl. X.R.

117—127, 161, 184; 260—47, 348, 239, 88.3, 830, 861, 75, 37